June 11, 1929.  G. M. J. MACKAY  1,716,545

THERMIONIC ELECTRODE

Filed March 6, 1926

Inventor:
George M. J. Mackay,
by *Alexander S. Lunt*
His Attorney.

Patented June 11, 1929.

1,716,545

UNITED STATES PATENT OFFICE.

GEORGE M. J. MACKAY, OF SCHENECTADY, NEW YORK, ASSIGNOR TO GENERAL ELECTRIC COMPANY, A CORPORATION OF NEW YORK.

THERMIONIC ELECTRODE.

Application filed March 6, 1926. Serial No. 92,920.

The present invention relates to thermionic or electronic devices and comprises in particular a new form of electrode for devices of this class, suitable for use either as cathode or anode.

My invention has particular reference to electrodes of the film-forming class, that is, electrodes on which during operation there is formed an adsorbed thin film of material, which is capable of stable operation, at a temperature so high that under other conditions the material would be immediately vaporized. An electrode operating with an adsorbed film of caesium is an example of this class which is described by Langmuir and Kingdon in the Proceedings of the Royal Society, A, vol. 107, 1925.

The present invention comprises a hollow or tubular electrode provided with a core of film-forming material which is capable of diffusing through the wall of the electrode at elevated temperatures at a sufficiently high rate to afford useful electron emission or positive ion generation.

Figure 2:
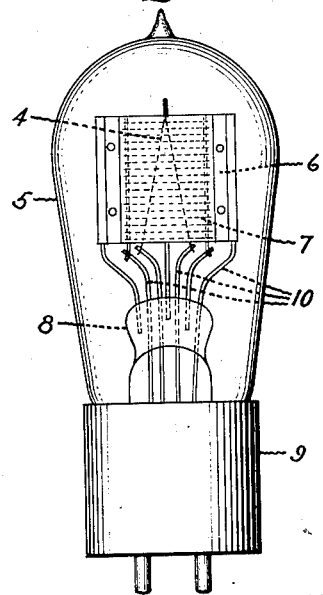
Figure 1:
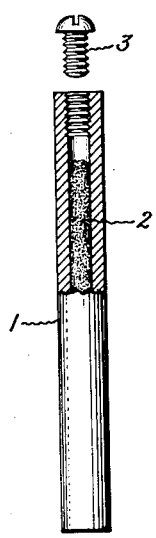
Figure 3:
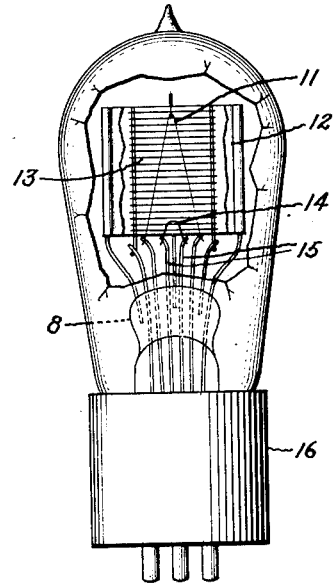
Figure 4:
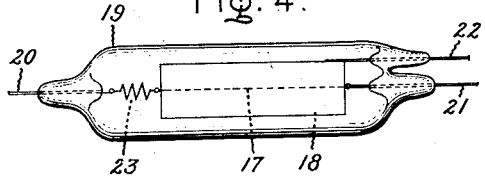

The accompanying drawings show in Fig. 1 an article constituting my invention in a preparatory stage, and Figs. 2, 3 and 4 illustrate different forms of discharge devices in which an electrode embodying my invention may be used.

In the preparation of an electrode embodying my invention, a tubular body 1, preferably closed at one end, is provided with a charge 2 of active material. The tubular holder may consist of iron, nickel, or similar metal, having a relatively high work function. The charge 2 of active material within the tube 1 may consist of a metal of lower electron affinity which is capable of diffusing through the walls of the finished article as for example, metallic caesium, rubidium, barium, calcium, thorium, cerium, or a related metal or of a mixture of these metals. Alternatively the tube may contain a mixture of a compound of the desired metal and a reducing agent which is capable, at the operating temperature of the electrode, of setting free the desired metal or metals, without forming deleterious by-products. For example, the tube may be filled with a mixture of caesium chloride and magnesium or calcium powder.

The metal tube when filled with the desired core material and closed by the insertion of the screw 3 is swaged in the well-known manner to a diameter small enough either to permit use of the wire directly in suitable lengths or to permit of further reduction by drawing through dies. The finished article may be mounted in a vacuum tube as, for example, shown in Figs. 2, 3 and 4.

In the device shown in Fig. 2 a wire containing a core material, as described above, is mounted as a cathode 4 in an evacuated envelope 5 which contains also an anode 6 and a grid 7 (indicated by dotted lines). These electrodes are connected to suitable leading-in wires 10 which are sealed by fusion of glass in a stem 8 and connected to external contacts mounted in a socket member 9 in a well understood manner.

In the device shown in Fig. 3 a wire made in accordance with my invention is used as a source of positive ions. The device here shown contains in addition to the cathode 11, the anode 12 and the grid 13, an electrode 14 consisting of a short length of wire containing an imbedded sensitizing material preferably caesium. The wire 14 is connected to leading-in wires 15 which are sealed into a stem 8 and connected to external contacts mounted in a plug member device 16, so that the wire 14 may be heated by passage of current to generate positive ions by the diffusion of the sensitizing material to the surface when the electrode 14 is heated. The generation of positive ions at a positive electrode is described in Science, vol. 57, p. 58 (1923), by Kingdon and Langmuir.

In the device shown in Fig. 4 a length of wire containing a core of caesium is used as an electrode 17 in the rectifying device containing also a cylindrical electrode 18, both electrodes being mounted within an envelope 19 into which are sealed leading-in conductors 20, 21 and 22. A spring 23 maintains the wire 17 taut. The electrode 17 may be used either as cathode or anode for the emission of electrons or for the generation of positive ions by heating to a suitable temperature as described in the above publications.

What I claim as new and desire to secure by Letters Patent of the United States is:—

1. An electrode comprising a sealed metal container and a material enclosed therein having a materially lower electron affinity than said container and being diffusible through the wall of said container at an elevated temperature.

2. An electrode comprising a sealed metal tube and a material therein which is diffusible through the wall of said tube and is capable of increasing the emissivity of said electrode.

3. An electrode comprising a sealed nickel container, said container having a filling of cæsium therein.

4. A filamentary cathode for vacuum-electric devices constituted of a metal tube and a core of material therein comprising cæsium as a constituent.

In witness whereof, I have hereunto set my hand this 5th day of March, 1926.

GEORGE M. J. MACKAY.